July 25, 1967 A. J. COTE, JR 3,333,118

SEMICONDUCTOR NEURISTOR BASED UPON THE ESAKI EFFECT

Filed April 27, 1965 3 Sheets-Sheet 1

INVENTOR

Alfred J. Cote, Jr.

BY

ATTORNEY

INVENTOR
Alfred J. Cote, Jr.

BY [signature]

ATTORNEY

INVENTOR
Alfred J. Cote, Jr.
BY [signature]
ATTORNEY

United States Patent Office 3,333,118

Patented July 25, 1967

3,333,118
SEMICONDUCTOR NEURISTOR BASED UPON THE ESAKI EFFECT

Alfred J. Cote, Jr., Silver Spring, Md., assignor to the United States of America as represented by the Secretary of the Navy Filed Apr. 27, 1965, Ser. No. 451,362
9 Claims. (Cl. 307—88.5)

ABSTRACT OF THE DISCLOSURE

An elongated tunnel diode mounted on one surface to an elongated conductive element and having a plurality of uniformly spaced conductive tabs mounted on the opposite surface; a voltage supply is connected at the element and the tabs for biasing said tunnel diode. A pulse generator is connected across one of the tabs and the element for initiating a breakdown in the region of the tunnel diode between the tab and the element; this breakdown spreads automatically into adjacent regions of the tunnel diode in the form of a pulse propagating down the diode junction, thereby simulating the disturbance of a neuron's axon when the axon is propagating a temporary change in equilibrium potential along the axon's length.

The invention described herein may be manufactured and used by or for the Government of the United States of America for governmental purposes without the payment of any royalties thereon or therefor.

The present invention relates generally to active pulse transmission devices and more particularly to a means for realizing in semiconductor form an active device called a neuristor. Neuristors are line-like structures which transmit pulses without attenuation in a manner similar to that employed by the axons of neurons. Because of their unique properties, neuristors can be interconnected to each other in various electrical networks in such a way as to realize a wide variety of information processing functions. For example, using only neuristors it is possible to realize any digital logic function, which in turn makes it possible to construct digital computers using only neuristors rather than combinations of transistors, resistors, capacitors or similar electronic components.

*I. The neuristor's function*

The neuristor concept was first proposed around 1960 by H. D. Crane while working at the Stanford University in California. One of Crane's later publications explaining the function of the neuristor is entitled, "Neuristor—A Novel Device and System Concept," Proc. IRE, vol. 50, pp. 2048–2060 (October 1962). Crane's early proposal for neuristor devices grew out of studies searching for limitations (and methods for overcoming them) related to microelectronics technology. In these studies it quickly became apparent that as one built smaller and smaller microelectronic systems, the wires interconnecting various parts of such systems must also shrink. A substantial reduction in wire size, however, is normally accompanied by an increase in wire impedance to values significantly high enough to limit the usefulness of these wires as a means for coupling signals from point to point in microelectronics systems.

While looking for a way to overcome this problem, Crane came to realize that the nervous systems of humans and animals successfully overcome the same difficulty by employing an unusual type of "wire." This "wire" is the axon portion of a neuron—an active transmission line which propagates pulses without attenuation. The nature of this attenuationless propagation deserves elaboration.

The propagating pulse of the axon takes the form of a moving discharge which can be compared to a propagating flame front moving along a chemical fuze. The difference between the two, however, is that the fuze can not be used again while the axon can support propagation for an indefinite number of times provided that it has had sufficient time to recover to its initial state before each new discharge is triggered. If an axon is examined at one moment in time when a single pulse is propagating along its length, there will be three distinct regions in evidence. One region is the portion of the axon which the pulse has not yet reached and this portion is in a charged or standby condition. The pulse itself is at the discharged portion of the axon while the portion of the axon over which the pulse has just traveled is in an unstable or partially discharged state and this latter portion will recover to its initial or charged state after a finite time.

A better analogy to the propagating pulse of the axon is that of the spread of flame in a forest fire. The unburned forest is in a charged state prior to being ignited in flame by a lightning bolt. The discharge (flame) then spreads automatically to the charged (unburned) portion of the forest. The flame leaves in its wake a discharged (burned) region which, after a period of time (several years) recovers to a charged state again. Only after recovery can it support a new propagation of flame. This phenomena is analogous to the essential features of the axon, and these features are embodied in the neuristor.

The neuristor device described in the aforementioned Crane article is a wire-like structure fabricated with appropriately distributed materials and immersed in a distributed power supply. The wire of the device proposed by Crane would maintain a standby charge distribution until triggered, at which time it would break down temporarily in the vicinity of the trigger point. The breakdown at this localized point would then spread outward in both directions along the wire, resulting in a propagating breakdown analogous to that of the axon. The recovery of the wire is referred to as the refractory phase of the process and during this time, as with the forest fire, a discharge is not readily triggered.

The invention to be described and hereinafter referred to as the Cote Neuristor, is capable of sustaining attenuationless pulse propagation in the manner suggested in the aforementioned Crane article. Additionally, the functional features of the neuristor device suggested by Crane are equally descriptive of the function provided by the Cote Neuristor and may be examined in FIGS. 1A–1D.

In FIG. 1A there is shown a triggered neuristor line at various times $t_1$, $t_2$ and $t_3$. When the neuristor line is triggered at the trigger point at time $t_1$, line segment D is in a discharged state and pulse propagation to the left and right of segment D is initiated. When the discharge propagates as shown at time $t_2$, the portion of the neuristor over which pulse propagation has just been sustained is in its refractory state as illustrated by section R of the line. At time $t_3$ a portion of the neuristor beneath the trigger point has completely recovered to its initial charged state while portions of the line immediately behind the propagating discharge remain in a refractory state.

In FIG. 1B two pulses traveling toward each other are shown to collide and vanish at the point of collision, leaving the neuristor line free to sustain further discharge propagation a finite time after the collision.

*II. The trigger and refractory junction*

As a result of the neuristor characteristics described in FIGS. 1A and 1B, pulses can be propagated between neuristors by the trigger and refractory junctions shown in FIGS. 1C and 1D respectively. In the trigger (T) junction in FIG. 1C, a pulse entering at 1 moves to the right and triggers similar pulses at the (T) junction which propagate toward 2 and 3. Since the pulse is being regenerated continually as it propagates, there is no change in pulse level at the (T) junction.

Using the refractory (R) junction shown in FIG. 1D, a pulse entering at 1 propagates to the right and leaves at 2 without energizing the line between 3 and 4. Similarly, a pulse entering at 3 leaves at 4 without triggering a pulse on line 1–2. However, when a pulse passes the (R) junction on either line it temporarily alters the conditions on the other line for a refractory period so that a pulse entering the second line during the refractory period can not be propagated past the (R) junction and hence dies out. For a description of one structural arrangement of a refractory junction, represented by FIG. 1D, reference should be made to the aforementioned Crane article.

*III. Prior art for realizing neuristor lines and junctions*

Included among the most advanced forms of neuristor devices demonstrated prior to this invention is the semidistributed multiple layer semiconductor model built by Rosengreen and disclosed in an article entitled, "Experimental Neuristor Gives Nerve-Like Pulse Propagation," Electronics, v. 36, No. 9, pp. 25–27 (Mar. 1963). The Rosengreen semiconductor neuristor combines a distributed semiconductor structure with discrete passive components (resistors and capacitors) in such a manner that the passive components are not fully distributed within the semiconductor structure.

This undesirable characteristic is also true for the neuristor device built by Mattson and disclosed in an article entitled, "A Neuristor Realization" (Letter) Proc. IEEE, v. 52, pp. 618–619 (May 1964). In the latter neuristor device resistance-capacitance networks are connected in parallel between n type mesa structure and the p silicon substrate of the neuristor.

*IV. The invention*

The present invention has been designed to overcome the obvious disadvantages of semidistributed neuristor structures of the type disclosed in the aforementioned Rosengreen and Mattson articles. The neuristor of the present invention does not require passive components in discrete form and, in fact, is prevented from being fully distributed only due to the fact that lead wires are required. Embodiments of the invention which do not require lead wires can be considered fully distributed.

Accordingly, it is an object of this invention to provide a completely new neuristor structure exhibiting attenuationless signal propagation similar to the propagation of ionic discharge along the axon of a nerve fiber.

It is another object of this invention to provide a neuristor device of the type described which requires no discrete passive components and which is prevented from being distributed only by the fact that lead lines are required to couple the devices to a source of operating voltage.

Other objects of the invention will become more fully apparent in the following description of several embodiments thereof when considered in connection with the accompanying drawings wherein.

FIGS. 5A, 5B, 5C, 5D and 5E diagrammatically illustrate several types of basic circuits which can be constructed using the basic neuristor device.

*V. Brief description*

Briefly described, the tunnel junction neuristor of this invention comprises an elongated tunnel diode mounted on an elongated conductive element and having a plurality of uniformly spaced conductive tabs mounted on one surface thereof. A voltage supply is connected between said conductive element and said conductive tabs for biasing said tunnel diode to a desired operating point on its negative resistance voltage-current characteristic. Pulse generating means are connected between one of said conductive tabs and said elongated conductive element for initiating a breakdown in the region of said tunnel diode between said one tab and said elongated conductive element. The breakdown will spread automatically into adjacent regions of the tunnel diode in the form of a pulse (discharge) propagating down the diode junction.

*VI. Detailed description and operation*

Figure 1A:
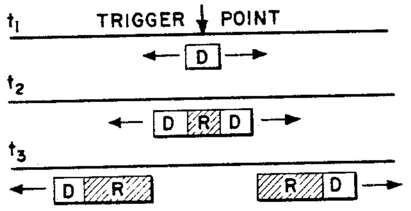
FIG. 1A is a diagrammatic illustration of a triggered neuristor line at various times $t_1$, $t_2$ and $t_3$.
Figure 1B:
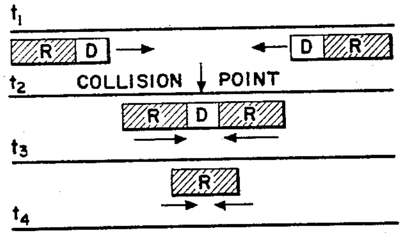
FIG. 1B is a diagrammatic illustration of a neuristor line at various times $t_1$, $t_2$, $t_3$ and $t_4$ as two pulses travel toward each other.
Figures 1C, 1D, 2:
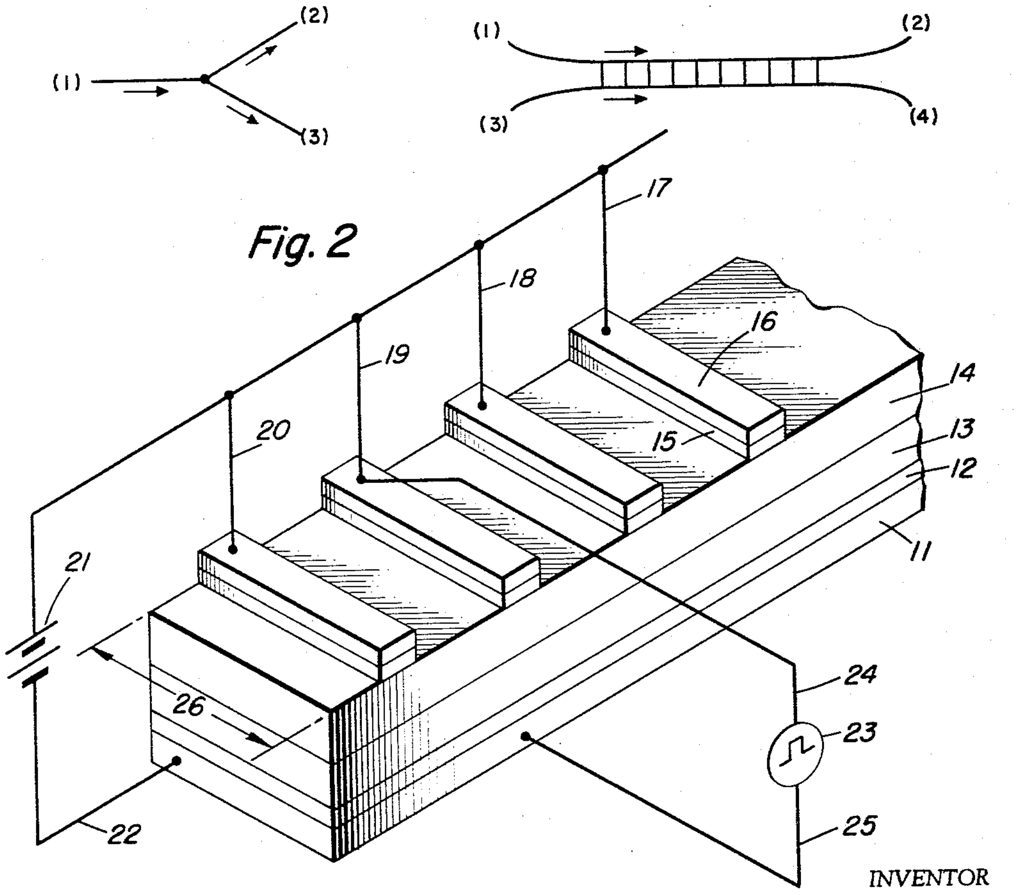
FIG. 1C is a diagrammatic illustration of a neuristor trigger junction.
FIG. 1D is a diagrammatic illustration of a neuristor refractory junction.
FIG. 2 is a perspective view of the basic neuristor device of the invention.

Referring now in detail to FIG. 2 there is shown an elongated conductive member 11 abutting a resistive layer 12 which is interposed between said conductive layer and an elongated tunnel diode including P section 14 and N section 13. A plurality of uniformly spaced resistive tabs 15 are contiguous with the top surface of P section 14 and each resistive tab carries a conductive tab 16 of similar size and shape.

Figure 3:
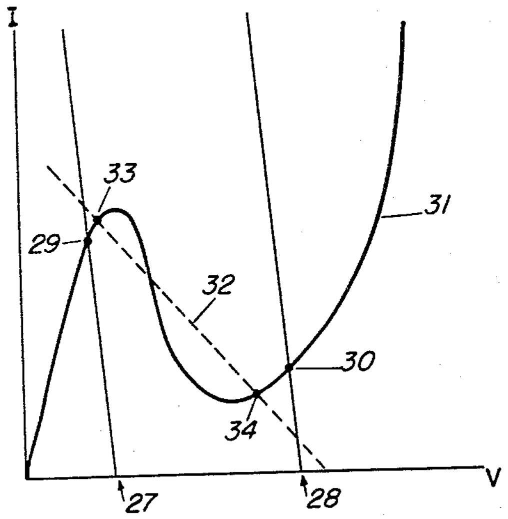
FIG. 3 is a diagrammatic illustration of the curve representing the negative resistance current-voltage characteristics of the tunnel diode in the basic neuristor device of FIG. 2.

The voltage supply 21 is connected between each of the conductive tabs 16 via lines 17–20, respectively, and the elongated conductive member 11, via line 22, and the voltage level at source 21 is set to a magnitude corresponding to either point 27 or 28 on the tunnel diode negative resistance current-voltage characteristic in FIG. 3. When the level at voltage source 21 is set to a magnitude corresponding to point 27 or 28, the operating point of each section of the device will be at 29 or 30 respectively.

A pulse generator 23 is connected via lines 24 and 25 between one of said tabs 16 and the elongated conductive member 11.

If the elongated tunnel diode is biased to operating point 29 in FIG. 3 and a positive pulse is applied to one conductive tab 16 as shown in FIG. 2 so that the total voltage between the tab and conducting member 11 exceeds the diode threshold voltage the device will break down or discharge in the region below the particular tab being triggered. For reasons not yet understood, the discharge will then spread automatically to adjacent regions and continue to propagate away from the trigger point. Each region which undergoes a discharge will automatically recover back to its initial state after a finite period of time referred to as the refractory period. During this refractory period a second discharge cannot be supported. The pulse moving down the tunnel diode exhibits attenuationless propagation and a uniform propagation velocity.

If the diode is biased to point 30 on the voltage-current characteristic, a negative pulse will be required to reduce the bias across the diode below the minimum point on the curve in FIG. 3 in order to initiate a breakdown or discharge.

In order to insure performance of the Cote neuristor shown in FIG. 2, the semiconductor layers 13 and 14 should be sufficiently heavily doped and the junction region between the two layers 13 and 14 should be sufficiently abrupt so that the diode will exhibit the Esaki negative resistance phenomena. This implies the use of semiconductor materials which have band gaps that insure a high tunneling probability.

The operating point 29 or 30 in FIG. 3 should be sufficiently close to the peak or valley of the negative resistance characteristic and the total resistance of layers 12 and 15 should be sufficiently small so that the total negative resistance curve is intersected at only one point. This last condition is equivalent to requiring that the load line be extended to provide monostable operation. It is possible however, with some combinations of doping and resistivity, to operate the Cote neuristor successfully with a bistable load line such as line 32 in FIG. 3. With a bistable load line the neuristor operation will be monostable because transients and nonlinearities will combine to prevent the device from settling at the second stable point.

It is also required for operation of the Cote neuristor that the tunnel curves be essentially the same at all points along the elongated tunnel diode.

There is a wide variety of fabrication methods which can be employed to build the device shown in FIG. 2 and any one of these methods which achieves the structure of FIG. 2 is satisfactory. In some cases, the resistive layers 12 and 15 need not necessarily be discrete elements as shown in FIG. 2, but may result naturally from the method employed to bond the layers 11 and 13 and layers 14 and 16. In this case the resistive layers are the interface contact resistances between layers 11 and 13 and layers 14 and 16.

Figure 4A:
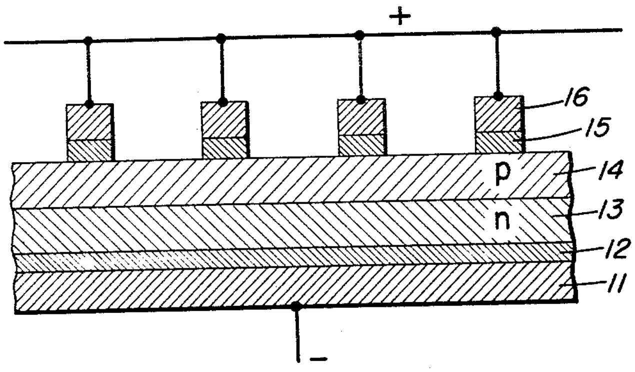
FIGS. 4A, 4B, 4C and 4D are side views of some alternative constructions of the basic neuristor device of FIG. 2.
Figure 4B:
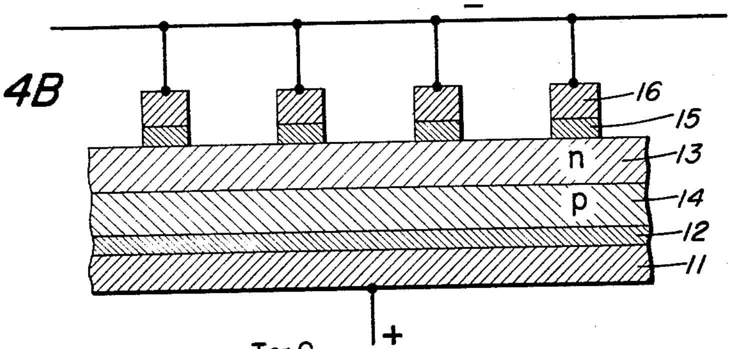
Figure 4C:
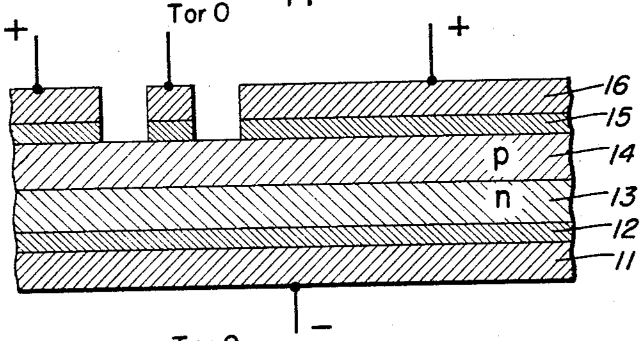
Figure 4D:
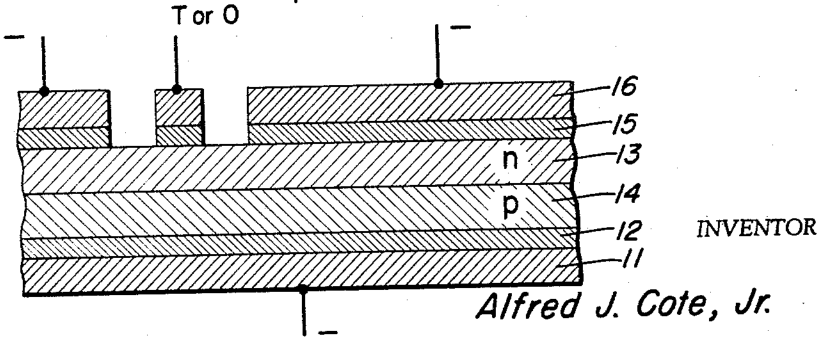

There are a number of alternative forms of the device shown in FIG. 2, some of which are shown in FIGS. 4A to 4D. In FIGS. 4A to 4D, various elevation views of some alternative embodiments of the invention are shown. FIG. 4A is an elevation view of FIG. 2, showing positive terminal of the voltage supply connected to the P-type semiconductor element 14. In FIG. 4B the voltage polarity has been reversed so that the negative voltage terminal is connected to the conductive tabs 16 and the positive terminal is connected to the elongated conductive element 11. FIGS. 4C and 4D show the power supply connection fully distributed on both sides of the tunnel diode with the exception of discrete contacts, T or O, required for triggering or monitoring signals propagating down the neuristor.

A wide variety of conductor, semiconductor and resistor materials can be employed to construct the Cote neuristor. The principal restrictions imposed upon these materials are those imposed upon the semiconductor since, in order to obtain large tunneling probabilities, materials having small forbidden energy gaps, low effective masses, and low dielectric properties should be selected. These requirements can be fulfilled with materials such as germanium, silicon, gallium arsenide, indium phosphoride, indium arsenide, and indium antimonide.

The resistive layers 12 and 15 need not be provided by distinct steps in the neuristor fabrication sequence although the resistance of these layers may be best controlled in this manner. There is, however, an upper limit on the values of these resistances which is dictated by the requirement for a monostable load-line as mentioned above. It should be emphasized that the values of bias represented by the operating point 29 or 30 in FIG. 3 can be employed in all of the embodiments of the invention shown in FIGS. 2 and 4, the resulting difference between the two choices being the polarities of trigger and propagating pulses.

*VII. Utility*

To illustrate the application of neuristors in realizing devices such as digital computers, FIGS. 5A to 5E has been included to provide an explanation of the neuristor analogy to a controlled switch.

Figure 5A:
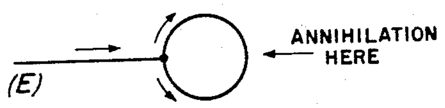

The neuristor is represented schematically either as a line or as a junction such as those shown in FIGS. 5A to 5E. In FIG. 5A, the neuristor structure behaves as follows: a pulse propagating down line E enters the ring via a T junction at the 9 o'clock position sending a pulse clockwise and counterclockwise from that point. These two pulses collide and annihilate each other at the 3 o'clock position.

Figure 5B:
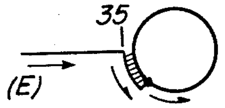

In FIG. 5B, the structure will permit a pulse entering at E to setup a counterclockwise circulating pulse on the ring since the refractory junction 35 prohibits clockwise circulation of a pulse entering the ring at the 7 o'clock position.

Figure 5C:
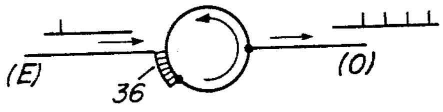

Circulating pulses can be tapped from the ring shown in FIG. 5C via a T junction at the 3 o'clock position without stopping the pulse circulation. Thus, a single pulse entering at E in FIG. 5C serves to turn-on a pulse train at O.

Figure 5D:
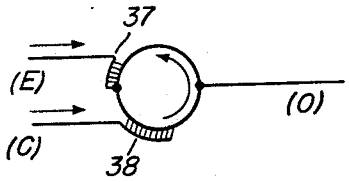

The pulse train can be deenergized as in FIG. 5D by the application of a pulse at C. The deenergizing pulse must arrive at the refractory junction 38 prior to the arrival of the pulse on the neuristor ring in order to be effective in annihilating the latter. This problem can be handled by always sending two properly spaced pulses in succession from C and if the first fails to annihilate the ring pulse, the second will.

Figure 5E:
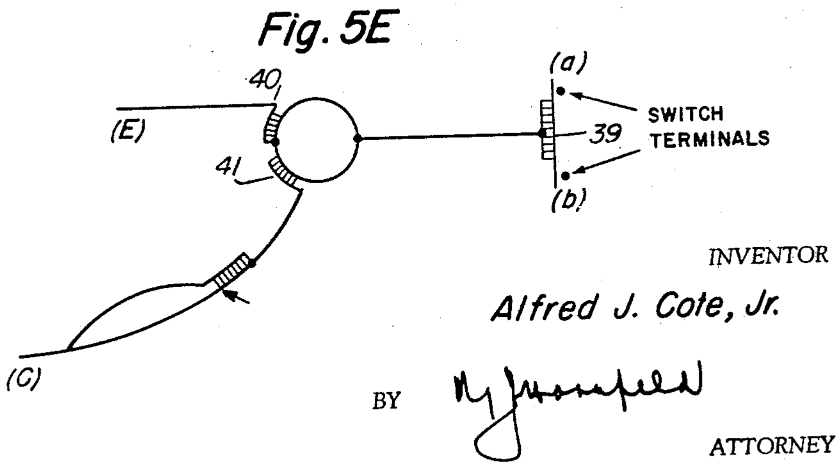

In FIG. 5E there is shown a neuristor device equivalent to a normally closed switch. With no signals applied to E and C, pulses can propagate freely in either direction between points *a* and *b* separated by the refractory junction 39. But the application of a pulse at E will result in pulses being applied to the neuristor line between points *a* and *b* via refractory junction 39. This will inhibit transmission on the line and thus open the switch between points *a* and *b*. The application of a pulse at C via refractory junction 41 will reclose the switch and the extra pulse doubling structure on the C line serves to create a pulse pair for each input pulse. Thus, the configuration in FIG. 5E represents a neuristor controlled switch and this is the basic component in a digital computer.

The most advanced forms of neuristors demonstrated prior to this invention combined distributed semiconductor structure with discrete passive components such as resistors and capacitors in such a manner that the passive components were not fully distributed within the semiconductor structure. The present invention does not require these passive components in discrete form and, in the absence of lead wires, the Cote neuristor can be considered fully distributed.

The present invention provides narrower pulse widths, faster pulse propagation velocities, and shorter recovery times than were obtainable in prior art neuristor devices. This fact makes possible, among other things, faster computing speeds in computer systems employing neuristors.

Because of its exploitation of the tunnel diode mechanism, the neuristor of the present invention is suitable for high temperature operation and is relatively insensitive to radiation damage and surface phenomena that adversely affect other semiconductor devices.

It should be understood that various modifications can be made to the above described embodiments without departing from the spirit and scope of the invention. Accordingly the invention is limited only by way of the following appended claims.

I claim:

1. A tunnel junction neuristor comprising (a) an elongated conductive element, (b) an elongated tunnel diode having two layers of opposite conductivity, said tunnel diode being mounted on said conductive element and having a plurality of uniformly spaced conductive tabs mounted thereon, (c) voltage supply means connected between said conductive element and said conductive tabs for biasing said tunnel diode, and (d) means connected between one of said tabs and said elongated conductive element for initiating a breakdown in the region of said tunnel diode between said one tab and said elongated conductive element whereby said breakdown will spread automatically to adjacent regions of said tunnel diode.

2. The neuristor of claim 1 wherein said initiating means is a pulse generator.

3. The neuristor of claim 1 which further includes (a) a discrete resistive element interposed between the exterior of one of the opposite conductivity layers of said tunnel diode and said elongated conductive element, and (b) a plurality of discrete resistive elements interposed between the exterior of the other opposite conductivity layer of said tunnel diode and the conductive tabs respectively.

4. The neuristor of claim 3 wherein the total value of resistance of said resistive elements is small enough to insure that the tunnel diode load line will intersect the negative resistance voltage current characteristic of said tunnel diode at only one point, said semiconductor materials having bandgaps that insure a high tunneling probability for the tunnel diode operation.

5. The neuristor of claim 4 wherein said initiating means is a pulse generator.

6. The neuristor of claim 1 wherein said voltage supply means is connected between said conductive element and all but one of said conductive tabs respectively whereby said one tab not being connected to said voltage supply is connectable to a pulse generator for initiating a discharge along said tunnel diode.

7. The neuristor of claim 1 wherein said voltage supply means is connected between said conductive element and all but one of said conductive tabs respectively whereby said one tab not being connected to said voltage supply is connectable to a device for monitoring pulse propagation along said tunnel diode.

8. A neuristor comprising (a) an elongated conductive element, (b) an elongated tunnel diode mounted on said conductive element, and (c) a plurality of uniformly spaced conductive tabs mounted on said tunnel diode, whereby a voltage supply means may be connected between said conductive element and said conductive tabs for biasing said tunnel diode, and further, whereby means may be connected between one of said conductive tabs and said conductive element for initiating a breakdown in the region of said tunnel diode between said one tab and said conductive element so that said breakdown may spread automatically to adjacent regions of said tunnel diode.

9. The neuristor of claim 8 further comprising (a) first conductive means connected to said conductive element and said conductive tabs, said first conductive means being connectable to said voltage supply means, and (b) second conductive means connected to said conductive element and one of said conductive tabs, said second conductive means being connectable to said initiating means.

References Cited

UNITED STATES PATENTS 3,238,504 3/1966 Crane ------------ 340—172.5

OTHER REFERENCES

Pub. I, "Neuristor—A Novel Device and System Concept," by Crane, in Proceedings of the IRE, dated October 1962, pages 2048–2060.

ARTHUR GAUSS, *Primary Examiner.*

S. MILLER, *Assistant Examiner.*